US008340127B2

(12) United States Patent
Gu et al.

(10) Patent No.: US 8,340,127 B2
(45) Date of Patent: Dec. 25, 2012

(54) METHOD, APPARATUS AND SYSTEM FOR ALLOCATING IPTV RESOURCES

(75) Inventors: Huailong Gu, Shenzhen (CN); Jun Li, Shenzhen (CN); Dongsheng Yue, Shenzhen (CN); Yiming Wang, Shenzhen (CN); Fuqing Huang, Shenzhen (CN); Zhenzhu Lv, Shenzhen (CN); Ting Zou, Shenzhen (CN); Qian Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 263 days.

(21) Appl. No.: 12/915,946

(22) Filed: Oct. 29, 2010

(65) Prior Publication Data

US 2011/0058550 A1 Mar. 10, 2011

Related U.S. Application Data

(63) Continuation of application No. PCT/CN2009/071208, filed on Apr. 9, 2009.

(30) Foreign Application Priority Data

Apr. 30, 2008 (CN) .......................... 2008 1 0094435

(51) Int. Cl.
*H04J 3/16* (2006.01)
*H04N 7/12* (2006.01)

(52) U.S. Cl. ...... 370/468; 370/230; 370/252; 348/384.1

(58) Field of Classification Search .......... 370/229–232, 370/252, 464, 465, 468; 725/51, 111–113; 348/384.1, 385.1, 388.1
See application file for complete search history.

(56) References Cited

U.S. PATENT DOCUMENTS

| | | | | |
|---|---|---|---|---|
| 8,098,609 | B2 * | 1/2012 | Sundaresan et al. | 370/312 |
| 8,127,011 | B2 * | 2/2012 | Monette | 709/226 |
| 2007/0147292 | A1 * | 6/2007 | Van Ewijk et al. | 370/329 |
| 2007/0268900 | A1 | 11/2007 | Park et al. | |
| 2009/0150943 | A1 * | 6/2009 | Vasudevan et al. | 725/86 |
| 2009/0183218 | A1 * | 7/2009 | Li et al. | 725/114 |

(Continued)

FOREIGN PATENT DOCUMENTS

CN 1992628 A 7/2007

(Continued)

OTHER PUBLICATIONS

Written Opinion of the International Searching Authority (translation) dated (mailed) Jul. 16, 2009, issued in related Application No. PCT/CN2009/071208, filed Apr. 9, 2009, Huawei Technologies Co., Ltd.

Second Chinese Office Action dated (mailed) Feb. 14, 2011, issued in related Chinese Application No. 200810094435.1 Huawei Technologies Co., LTD.

(Continued)

*Primary Examiner* — Kerri Rose

(74) *Attorney, Agent, or Firm* — Leydig, Voit & Mayer, Ltd.

(57) ABSTRACT

The present invention relates to the field of communications technologies, and discloses a method, an apparatus, and a system for allocating Internet Protocol Television (IPTV) resources to save bandwidth resources in the IPTV service. The method includes the following: a multicast access control entity allocates resources to a unicast access control entity through an intermediate network entity when unicast resources are not enough; and the unicast access control entity allocates resources to the multicast access control entity through the intermediate network entity when multicast resources are not enough. The present invention is primarily applicable to IPTV technologies.

15 Claims, 10 Drawing Sheets

U.S. PATENT DOCUMENTS

| | | | | |
|---|---|---|---|---|
| 2009/0201889 | A1* | 8/2009 | Sundaresan et al. | 370/336 |
| 2009/0238200 | A1* | 9/2009 | Melsen et al. | 370/431 |
| 2010/0005499 | A1* | 1/2010 | Covey | 725/109 |

FOREIGN PATENT DOCUMENTS

| | | | |
|---|---|---|---|
| CN | 101060473 | A | 10/2007 |
| CN | 101146255 | A | 3/2008 |
| EP | 1 802 046 | A1 | 12/2005 |
| WO | WO 2009/132546 | A | 5/2009 |
| WO | WO 2009/132546 | A1 | 5/2009 |

OTHER PUBLICATIONS

First Chinese Office Action dated (mailed) Jan. 9, 2010, issued in related Chinese Application No. 200810094435.1 Huawei Technologies Co., Ltd.

NGN-GSI/DOC-301, "OutPut-Draft Recommendation Y.RACF (Y.2111) Release 2 (Version 0.4.0)" ITU-Telecommunication Standardization Sector Study Period 2005-2008NGN GSI Rapporteur Group Meeting: Beijing, Sep. 2007.

Ooghe, S. et al., "Framework and Requirements for an Access Node control Mechanism in Broadband Multi-Service Networks, draft-ietf-ancp-framework-05.txt," The IETF Trust Fund, Feb. 19, 2008.

International Search Report for International Application No. PCT/CN2009/071208, mailed Jul. 16, 2009 Huawei Technologies Co., Ltd.

The extended European search report for Application No. 09737656.0-1244; mailing date of Jul. 21, 2011 for Huawei Device Co., Ltd.; (8 pgs.).

ETSI ES 282 003 V2.0.0 (May 2008), ETSI Standard; Telecommunications and Internet converged Services and Protocols for Advanced Networking (TISPAN); Resource and Admission Control Sub-System (RACS): Functional Architecture; (135 pgs.)

Ooghe, S., et al.; Framework and Requirements for an Access Node Control Mechanism in Broadband Multi-Service Networks (draft-ietf-ancp-framework-04.txt); dated Nov. 15, 2007; Network Working Group; Internet-Draft; Intended status: Informational; Expires: May 18, 2008 (41 pgs.).

Cuevas, M.; Admission control and resource reservation for session-based applications in next generation networks; BT Technology Journal vol. 23 No. 2—Apr. 2005; (16 pgs.).

S. Ooghe et al. Framework and Requirements for an Access Node Control Mechanism in Broadband Multi-Service Networks draft-ietf-ancp-framework-05.txt, Network Working Group, Internet-Draft Intended status: Informational: Expires Aug. 22, 2008, ANCP Framework Feb. 2008 (.

ITU-Telecommunication Standardization Sector Study Period 2005-2008, NGN GSI Rapporteur Group Meeting: Beijing, Sep. 10-21, 2007, Title: Output—Draft Recommendation Y.RACF (Y.2111) Release 2 (Version 0.4.0) NGN-GSI/DOC (15 pages).

First Chinese Office Action dated (mailed) Sep. 1, 2010, issued in related Chinese Application No. 200810094435.1 Huawei Technologies C., Ltd (10 pages).

International Search Report dated (mailed) Jul. 16, 2009, for application No. PCT/CN2009/071208.

* cited by examiner

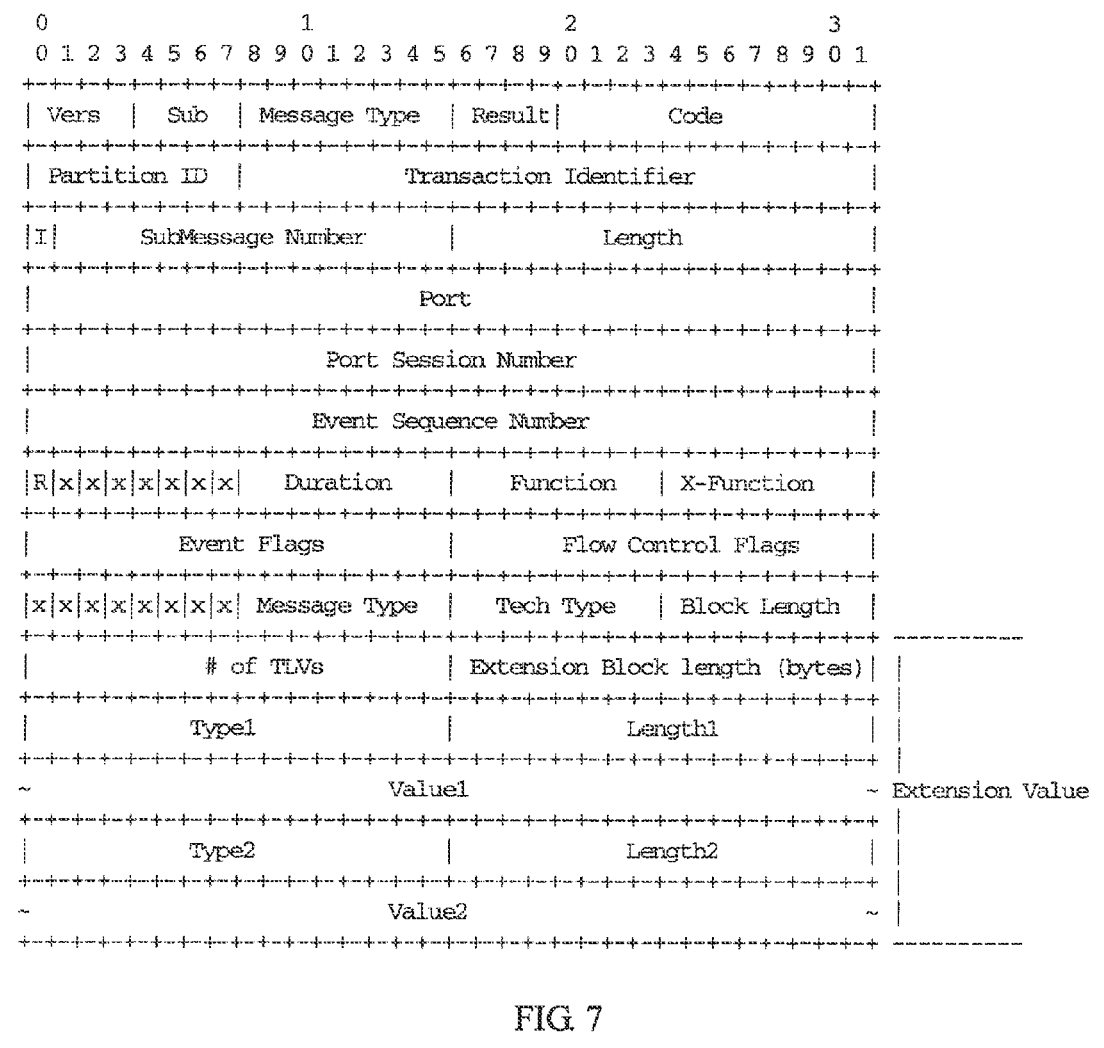

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Vers  |  Sub  | Message Type  | Result|         Code          |
+-+-+-+-+-+-+-+-+-+-+-+-+-+-+-+-+-+-+-+-+-+-+-+-+-+-+-+-+-+-+-+-+
| Partition ID  |            Transaction Identifier             |
+-+-+-+-+-+-+-+-+-+-+-+-+-+-+-+-+-+-+-+-+-+-+-+-+-+-+-+-+-+-+-+-+
|I|       SubMessage Number     |            Length             |
+-+-+-+-+-+-+-+-+-+-+-+-+-+-+-+-+-+-+-+-+-+-+-+-+-+-+-+-+-+-+-+-+
|                              Port                             |
+-+-+-+-+-+-+-+-+-+-+-+-+-+-+-+-+-+-+-+-+-+-+-+-+-+-+-+-+-+-+-+-+
|                      Port Session Number                      |
+-+-+-+-+-+-+-+-+-+-+-+-+-+-+-+-+-+-+-+-+-+-+-+-+-+-+-+-+-+-+-+-+
|                     Event Sequence Number                     |
+-+-+-+-+-+-+-+-+-+-+-+-+-+-+-+-+-+-+-+-+-+-+-+-+-+-+-+-+-+-+-+-+
|R|x|x|x|x|x|x|x|   Duration    |   Function    |  X-Function   |
+-+-+-+-+-+-+-+-+-+-+-+-+-+-+-+-+-+-+-+-+-+-+-+-+-+-+-+-+-+-+-+-+
|          Event Flags          |      Flow Control Flags       |
+-+-+-+-+-+-+-+-+-+-+-+-+-+-+-+-+-+-+-+-+-+-+-+-+-+-+-+-+-+-+-+-+
|x|x|x|x|x|x|x|x| Message Type  |   Tech Type   | Block Length  |
+-+-+-+-+-+-+-+-+-+-+-+-+-+-+-+-+-+-+-+-+-+-+-+-+-+-+-+-+-+-+-+-+ ----------
|           # of TLVs           | Extension Block length (bytes)| |
+-+-+-+-+-+-+-+-+-+-+-+-+-+-+-+-+-+-+-+-+-+-+-+-+-+-+-+-+-+-+-+-+ |
|             Type1             |            Length1            | |
+-+-+-+-+-+-+-+-+-+-+-+-+-+-+-+-+-+-+-+-+-+-+-+-+-+-+-+-+-+-+-+-+ |
~                             Value1                            ~ Extension Value
+-+-+-+-+-+-+-+-+-+-+-+-+-+-+-+-+-+-+-+-+-+-+-+-+-+-+-+-+-+-+-+-+ |
|             Type2             |            Length2            | |
+-+-+-+-+-+-+-+-+-+-+-+-+-+-+-+-+-+-+-+-+-+-+-+-+-+-+-+-+-+-+-+-+ |
~                             Value2                            ~ |
+-+-+-+-+-+-+-+-+-+-+-+-+-+-+-+-+-+-+-+-+-+-+-+-+-+-+-+-+-+-+-+-+ ----------
```

FIG. 7

METHOD, APPARATUS AND SYSTEM FOR ALLOCATING IPTV RESOURCES

CROSS-REFERENCE TO RELATED APPLICATIONS

This application is a continuation of International Application No. PCT/CN2009/071208, filed on Apr. 9, 2009, which claims priority to Chinese Patent Application No. 200810094435.1, filed on Apr. 30, 2008, both of which are hereby incorporated by reference in their entireties.

FIELD OF THE INVENTION

The present invention relates to the field of communications technologies, and in particular, to a method, an apparatus, and a system for allocating Internet Protocol Television (IPTV) resources.

BACKGROUND OF THE INVENTION

The IPTV video service consumes a lot of bandwidth, and permits no packet loss in the process of transmitting video data. Network bandwidth, especially user link bandwidth, however, is rather limited. To ensure normal running of an IPTV video service and ensure Quality of Service (QoS), a Resource Management (RM) function and a Connection Admission Control (CAC) function need to be deployed in the network.

IPTV services include multicast/broadcast video (such as BTV, i.e., Broadcast TV) and unicast video (such as VOD, i.e., Video-On-Demand). The working mode of a multicast service differs from that of a unicast service sharply, and therefore, the two services implement the CAC function in different ways:

For a multicast service, the multicast CAC is generally performed on an Access Node (AN) locally. That is, when user dial-up is detected and the user requests to join a channel, the AN judges whether the link bandwidth of the user satisfies the bandwidth requirement of the requested channel, or judges whether the number of channels joined by the user exceeds an upper limit. If the link bandwidth of the user is not enough or the number of channels joined by the user exceeds the upper limit, the CAC on the AN fails, and the AN rejects the user's request for joining the channel.

In a unicast service, the unicast CAC function is generally performed by a stand-alone RM server. The RM server knows the network topology and manages the end-to-end bandwidth from the unicast video server to the client. Therefore, when the user requests a unicast video service, a service server requests resources from the RM server, and the RM server judges whether the end-to-end bandwidth satisfies the bandwidth requirement of the unicast video service and returns a resource request result to the service server. Finally, the service server decides, according to the resource request result, whether to admit the service.

In the process of implementing the IPTV service in the prior art, a first solution in the prior art reserves the bandwidth for the multicast service and the unicast service separately. Consequently, the multicast service and the unicast service cannot share bandwidth resources, resulting in a waste of bandwidth resources. Moreover, this solution is applicable to limited scenarios, namely, applicable only if the user link bandwidth is wide enough.

In a second solution in the prior art, the AN reports join information of a multicast user, and the RM server performs CAC uniformly, and this unifies the implementation mode of the CAC for the multicast service and the unicast service.

However, the implementation process is complicated. Moreover, the switching frequency of the multicast service is greater than the switching frequency of the unicast service. Television users switch the channel frequently, resulting in massive information interactions between the AN and the BM server, or between the AN/Broadband Network Gateway (BNG) and the BM server. Consequently, the channel switching duration is long, delay occurs, and the user experience is affected.

SUMMARY OF THE INVENTION

A method for allocating IPTV resources is provided in an embodiment of the present invention, and the method helps save bandwidth resources in the IPTV service.

A method for allocating IPTV resources includes:

allocating, by a multicast access control entity, resources to a unicast access control entity through an intermediate network entity when unicast resources are not enough; and allocating, by the unicast access control entity, resources to the multicast access control entity through the intermediate network entity when multicast resources are not enough.

An apparatus for allocating IPTV resources is provided in an embodiment of the present invention, and the apparatus helps save bandwidth resources in the IPTV service.

A resource allocation apparatus includes:

a receiving unit, configured to receive a resource allocation message sent by a unicast or multicast access control entity and forwarded by an intermediate network entity;

a resource allocating unit, configured to allocate resources to the unicast or multicast access control entity through the intermediate network entity when unicast or multicast resources are not enough; and a sending unit, configured to send a resource allocation response to the unicast or multicast access control entity.

A system for allocating IPTV resources is provided in an embodiment of the present invention, and the system helps save bandwidth resources in the IPTV service.

A resource allocation system includes:

a multicast access control entity, configured to allocate resources to a unicast access control entity through an intermediate network entity when unicast resources are not enough;

the unicast access control entity, configured to allocate resources to the multicast access control entity through the intermediate network entity when multicast resources are not enough; and the intermediate network entity, configured to transfer information for the multicast access control entity or unicast access control entity as an intermediary between the multicast access control entity and the unicast access control entity.

Through the method, apparatus, and system for allocating resources in the embodiments of the present invention, resources are shared between the multicast access control entity and the unicast access control entity through an intermediate network entity, resources are allocated to the user dynamically, bandwidth resources of the IPTV service are saved, and the user experience is improved; moreover, when the user switches channels, the interactions between devices are reduced, the delay of the IPTV service is shortened, and the user experience is further improved.

BRIEF DESCRIPTION OF THE DRAWINGS

FIG. 7 shows a format of a line configuration message in a method for allocating IPTV resources;

DETAILED DESCRIPTION OF THE EMBODIMENTS

A method for allocating IPTV resources is provided in an embodiment of the present invention. The embodiments of the present invention are detailed below with reference to accompanying drawings.

Embodiment 1

Figure 1:
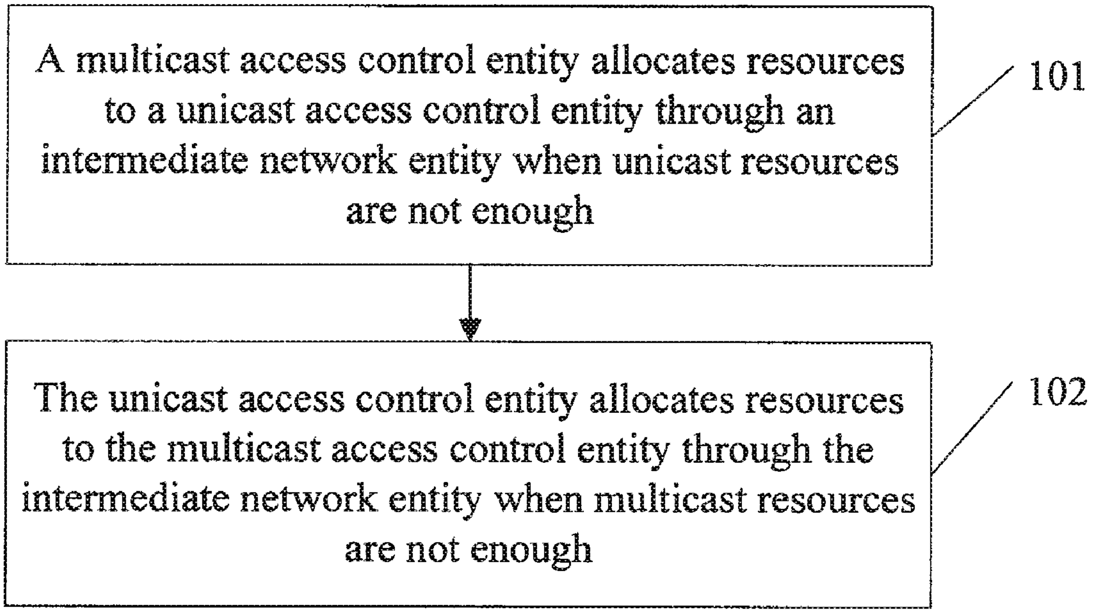
FIG. 1 is a flowchart of a method for allocating IPTV resources in a first embodiment of the present invention.

As shown in FIG. 1, a method for allocating IPTV resources in the embodiment 1 of the present invention includes the following steps:

Step 101: A multicast access control entity allocates resources to a unicast access control entity through an intermediate network entity when unicast resources are not enough.

Step 102: The unicast access control entity allocates resources to the multicast access control entity through the intermediate network entity when multicast resources are not enough.

The foregoing process shows that: When a user accesses the service, if the unicast/multicast resources are not enough, the multicast access control entity or unicast access control entity can allocate resources to the party which lacks resources through the intermediate network entity. Therefore, with the method provided in this embodiment, resources are allocated to the user dynamically, bandwidth resources of the IPTV service are saved, and the user experience is ensured.

In this embodiment, the unicast resources refer to unicast bandwidth, and the multicast resources refer to multicast bandwidth. In all embodiments described below, bandwidth is taken as an example of network resources. In practical applications, the intermediate network entity transfers information between the unicast access control entity and the multicast access control entity, and converts the message of the unicast/multicast access control entity into a message that can be resolved by the multicast/unicast access control entity. Nevertheless, information can be transferred between the multicast access control entity and the unicast access control entity directly. In this case, the communications between the multicast access control entity and the unicast access control entity may be based on the Diameter protocol.

Besides, in the embodiments of the present invention, the multicast access control entity may be an AN, the intermediate network entity may be a Broadband Remote Access Server (BRAS), and the unicast access control entity may be a Resource Admission Control Subsystem (RACS). The resource configuration information of the user may be stored on the AN or RACS, which can be set beforehand as required. The three entities mentioned above are taken as examples in the detailed description of the following embodiments.

Embodiment 2(In the Case that Unicast Resources are not Enough)

Figure 2A:
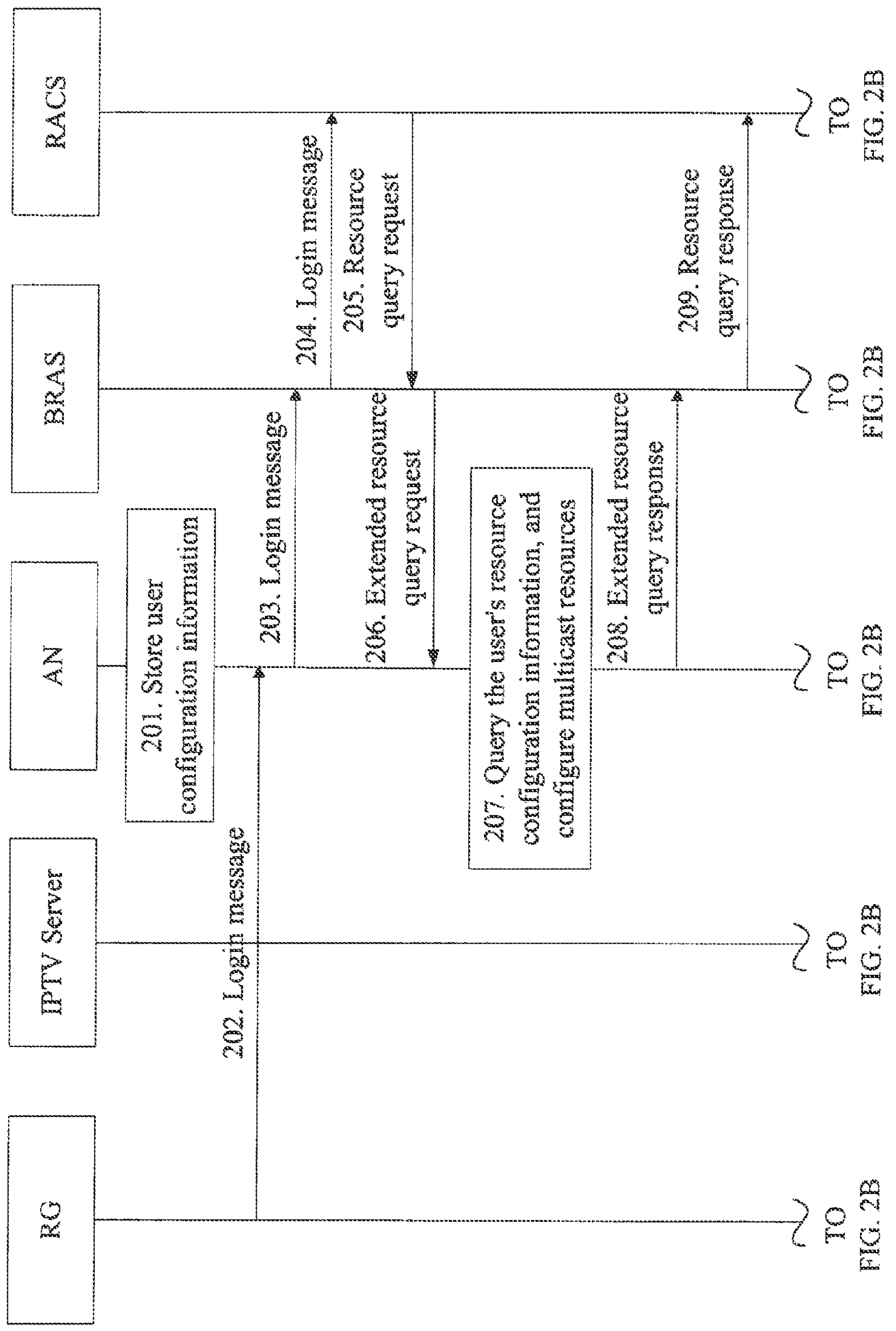
FIGS. 2A and 2B show a flowchart of a method for allocating IPTV resources in a second embodiment of the present invention.
Figure 2B:
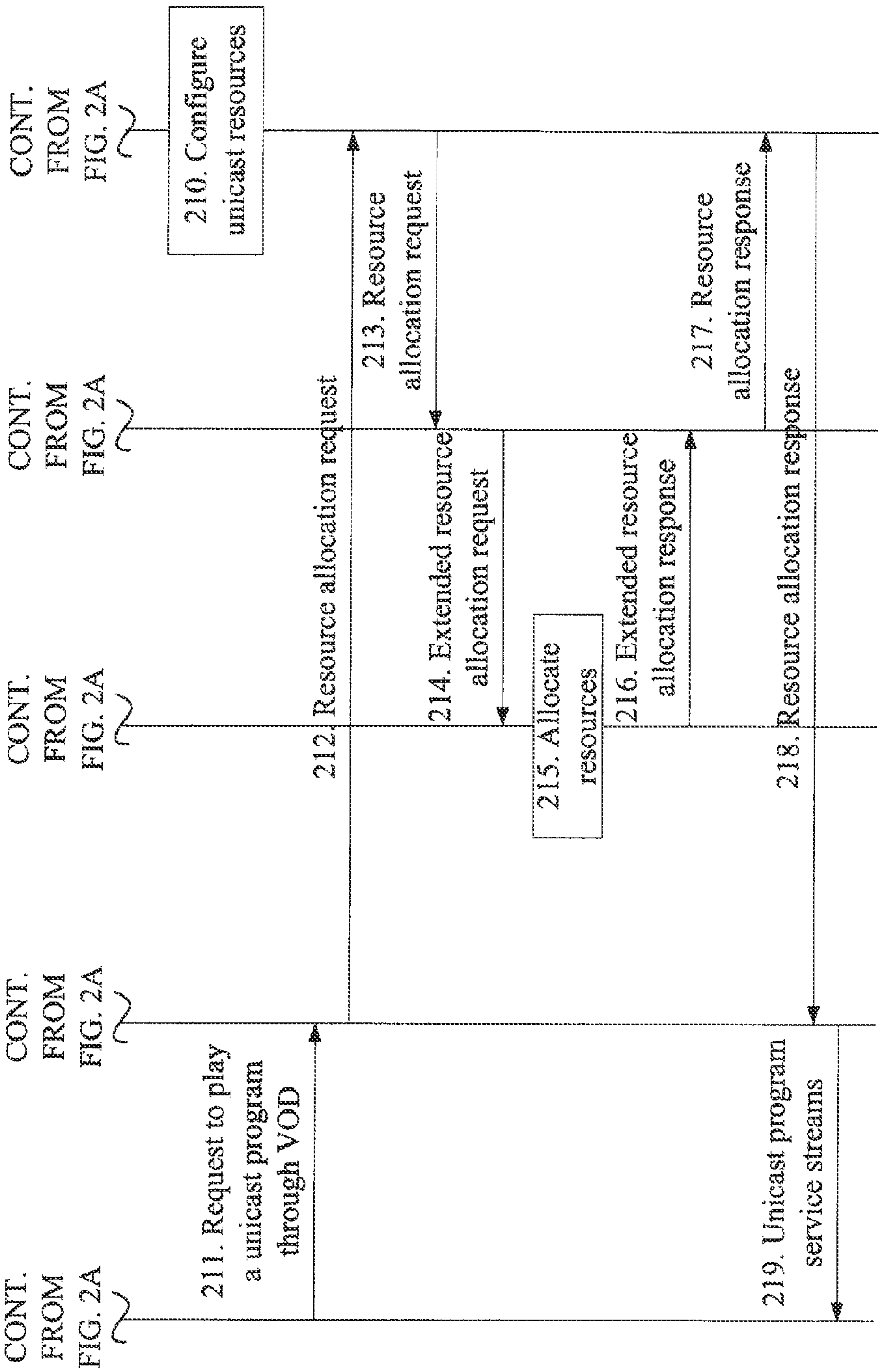

As shown in FIGS. 2A and 2B, after the user accesses the service, the unicast resources are not enough, and the process of allocating unicast resources includes the following steps:

201. The resource configuration information of the user is stored on the AN beforehand.

202. When a user logs in, the Residential Gateway (RG) of the user sends a user login message to the AN.

203. The AN sends the login message to the BRAS.

204. After receiving the login message, the BRAS authenticates the identity of the user, and sends the login message to the RACS after the user is authenticated as legal.

205. The RACS sends a resource query request to the BRAS.

206. The BRAS resolves the resource query request, obtains the information such as user ID in the resource query request, and sends the resolved information to the AN through an extended resource query request.

207. After receiving the extended resource query request, the AN queries the user's resource configuration information according to the obtained information such as user ID, and configures multicast resources for the user; if the configuration fails, the AN sends an extended configuration failure message to the BRAS.

208. The AN sends a resource configuration result to the BRAS through an extended resource query response.

209. The BRAS sends the resource configuration result to the RACS through a resource query response.

210. The RACS configures unicast resources according to the response.

In the process of the IPTV unicast service, the unicast resources are not enough.

211. The RG requests a unicast program from the IPTV server through Video On Demand (VOD).

212. The IPTV server sends a resource allocation request to the RACS. The resource allocation request carries information such as the bandwidth (for example, 2 M) of the requested unicast program and user ID.

213. The RACS calculates the unicast bandwidth of the user according to the resource allocation request, and finds that the unicast resources of the user are not enough, and then sends a resource allocation request to the BRAS.

214. The BRAS sends the request to the AN through an extended resource allocation request.

215. The AN allocates the corresponding multicast bandwidth to the RACS according to the unicast bandwidth requested in the extended resource allocation request.

216. The AN sends an extended resource allocation response to the BRAS. The extended resource allocation response carries the unicast bandwidth allocated to the RACS.

217. The BRAS sends a resource allocation response to the RACS.

218. The RACS sends the resource allocation response to the IPTV server.

219. The IPTV server sends unicast program service streams to the RG.

After completion of the foregoing process, if the unicast bandwidth is 6M and the multicast bandwidth is 4M before the resource allocation, the unicast bandwidth changes to 8M and the multicast bandwidth changes to 2M after the resource allocation.

Embodiment 3(In the Case that Multicast Resources are not Enough)

Figure 3:
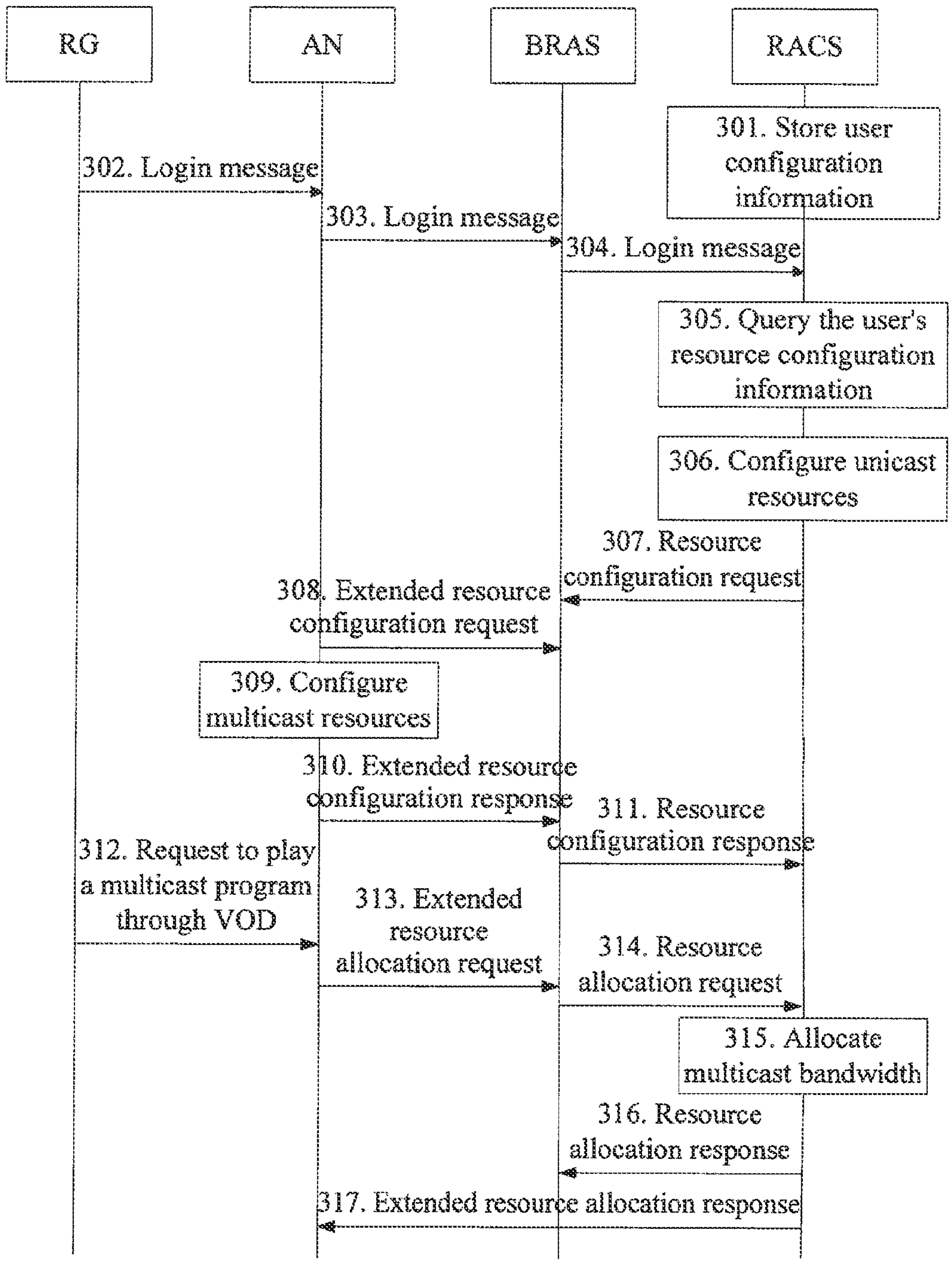
FIG. 3 is a flowchart of a method for allocating IPTV resources in a third embodiment of the present invention.

As shown in FIG. 3, after the user accesses the service, the multicast resources are not enough, and the process of allocating multicast resources includes the following steps:

301. The resource configuration information of the user is stored on the RACS beforehand.

302. When a user logs in, the RG of the user sends a user login message to the AN.

303. The AN sends the login message to the BRAS.

304. After receiving the login message, the BRAS authenticates the identity of the user, and sends the login message to the RACS after the user is authenticated as legal.

305. The RACS queries the resource configuration information corresponding to the user according to the information such as user ID.

306. The RACS configures unicast resources for the user.

307. The RACS sends a resource configuration request to the BRAS. The resource configuration request carries information such as the user ID, total video bandwidth, and multicast resources.

308. The BRAS sends the request to the AN through an extended resource configuration request according to the resource configuration request.

309. The AN configures the multicast resources.

310. The AN sends an extended resource configuration response to the BRAS.

311. The BRAS sends a resource configuration response to the RACS.

In the process of the IPTV multicast service, the multicast resources are not enough.

312. The RG requests a multicast program from the AN through VOD.

313. After exercising admission control over the user, the AN finds that the multicast resources of the user are not enough and sends an extended resource allocation request to the BRAS.

314. The BRAS sends a resource allocation request to the RACS. The resource allocation request carries information such as the requested multicast bandwidth and user ID.

315. The RACS allocates the multicast bandwidth according to the resource allocation request.

316. The RACS sends a resource allocation response to the BRAS.

317. The BRAS sends an extended resource allocation response to the AN.

After completion of the foregoing process, if the unicast bandwidth is 6M and the multicast bandwidth is 4M before the resource allocation, the unicast bandwidth changes to 2M and the multicast bandwidth changes to 8M after the resource allocation.

Embodiment 4(Releasing Multicast Resources)

Figure 4:
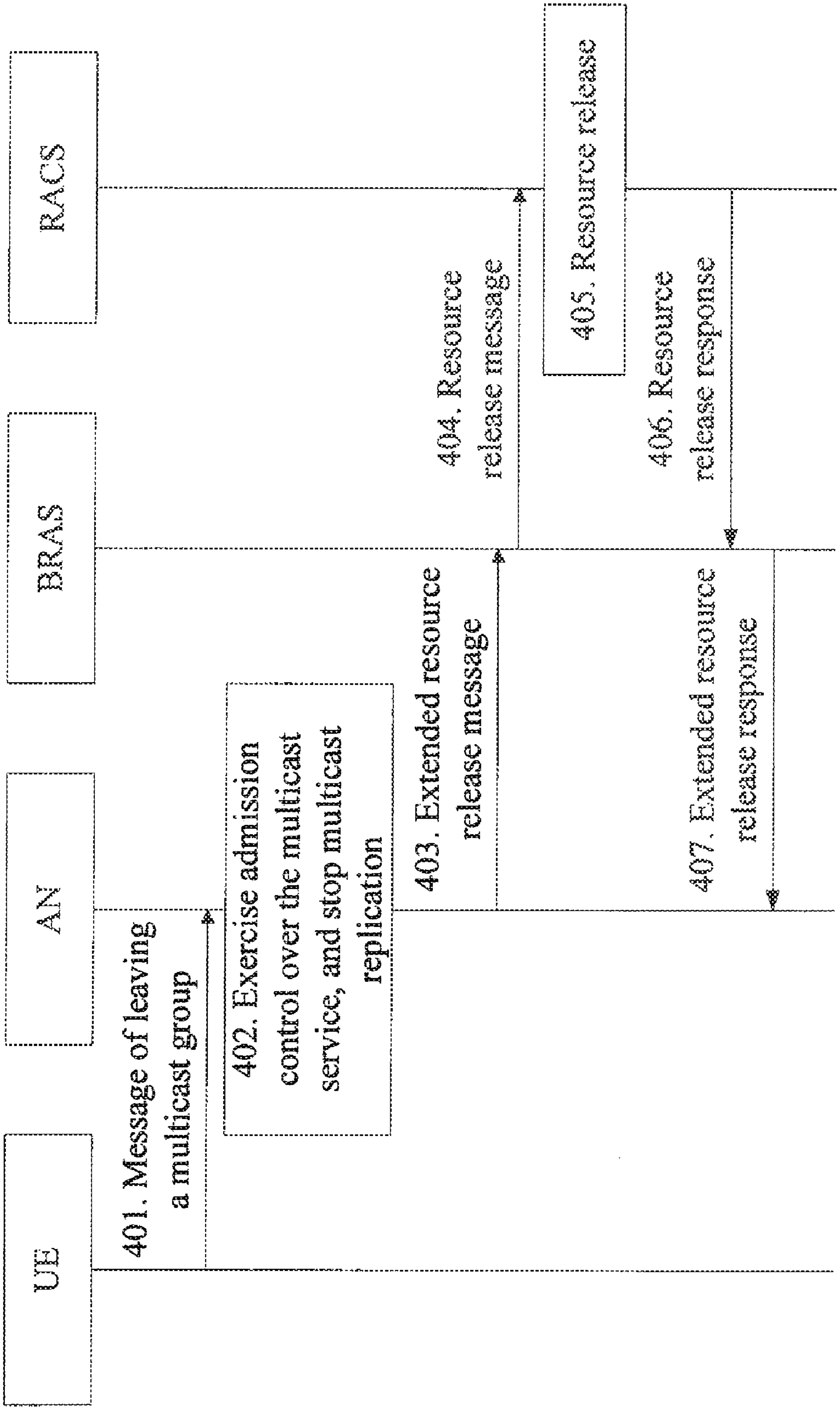
FIG. 4 is a flowchart of a method for allocating IPTV resources in a fourth embodiment of the present invention.

On the basis of the third embodiment (namely, after the AN requests the multicast resources from the RACS), when the user requests to leave the multicast group, the multicast resources previously requested from the RACS are released. As shown in FIG. 4, the process of releasing the multicast resources is as follows:

401. The User Equipment (UE) sends a message of leaving the multicast group to the AN.

402. The AN exercises admission control over the multicast service, and stops multicast replication.

403. The AN sends an extended resource release message to the BRAS. The extended resource release message carries information such as user ID and bandwidth to be released.

404. The BRAS sends a resource release message to the RACS.

405. The RACS takes back the resources previously allocated to the AN according to the resource release message.

406. The RACS sends a resource release response to the BRAS.

407. The BRAS sends an extended resource release response to the AN, indicating success or failure of releasing the resources.

Embodiment 5(Releasing Unicast Resources)

Figure 5:
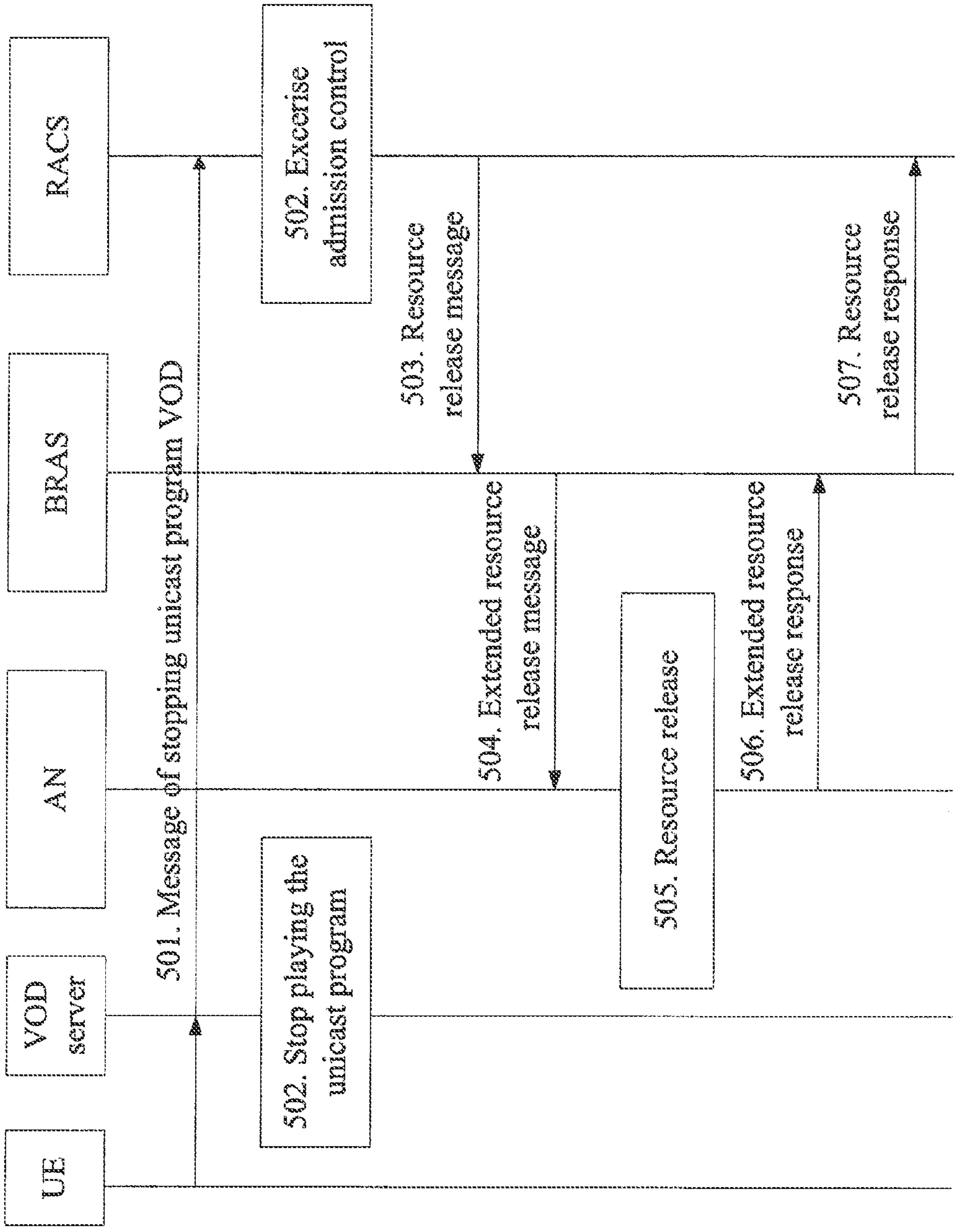
FIG. 5 is a flowchart of a method for allocating IPTV resources in a fifth embodiment of the present invention.

On the basis of the second embodiment (namely, after the RACS requests the unicast resources from the AN), when the user stops VOD of the unicast program, the unicast resources previously requested from the AN are released. As shown in FIG. 5, the process of releasing the unicast resources is as follows:

501. The UE sends a message of stopping unicast program VOD to the RACS through a VOD server.

502. The RACS exercises admission control over the unicast program, and the VOD server stops playing the unicast program.

503. The RACS sends a resource release message to the BRAS. The resource release message carries information such as user ID and bandwidth to be released.

504. The BRAS sends an extended resource release message to the AN.

505. The AN takes back the resources previously allocated to the RACS according to the extended resource release message.

506. The AN sends an extended resource release response to the BRAS.

507. The BRAS sends a resource release response to the RACS, indicating success or failure of releasing the resources.

Embodiment 6(In the Case that the RACS Recovers from Failure)

Figure 6:
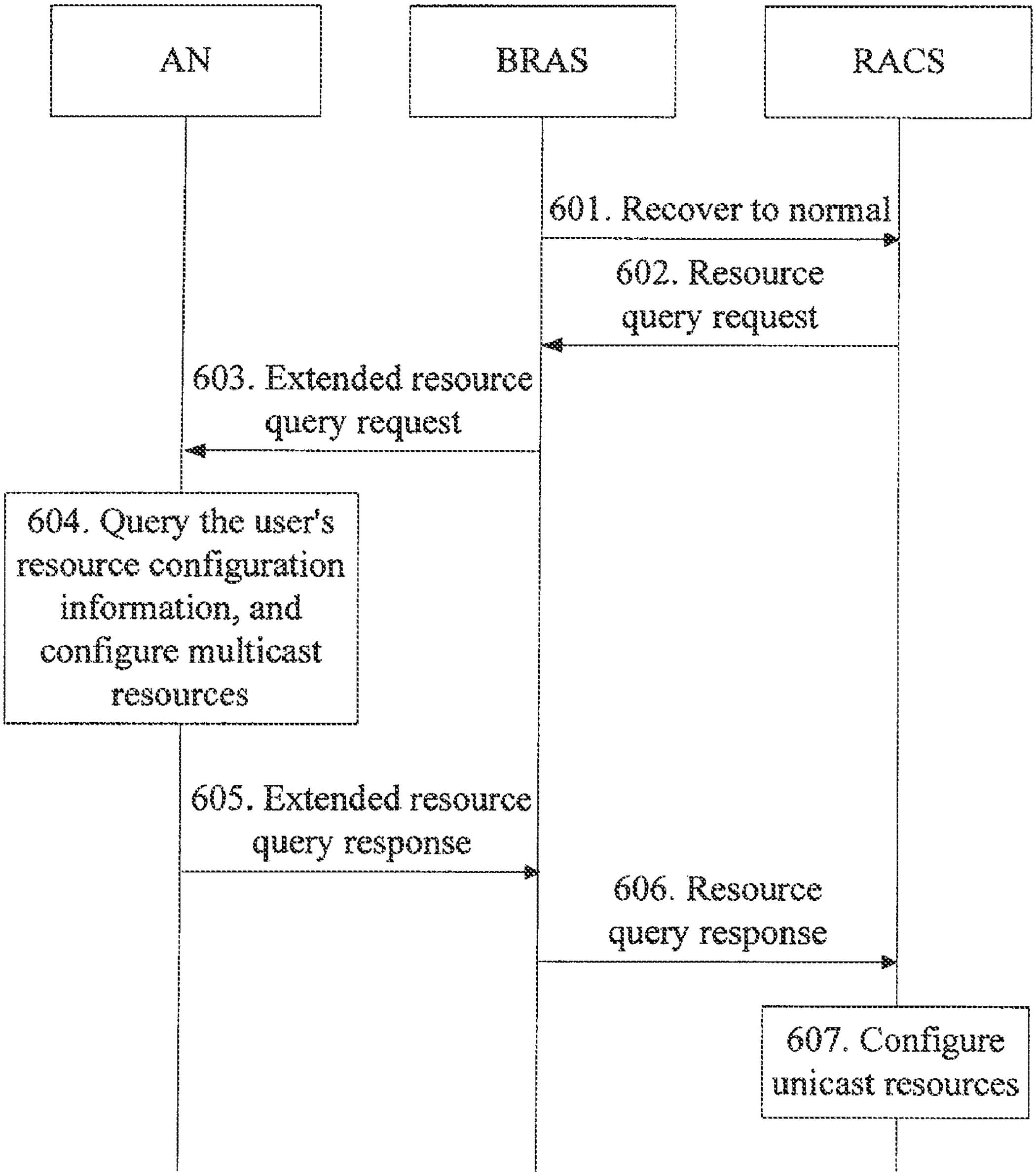
FIG. 6 is a flowchart of a method for allocating IPTV resources in a sixth embodiment of the present invention.

As shown in FIG. 6, this circumstance occurs when the user's resource configuration information is stored on the AN, and the processing process is as follows:

601. The BRAS notifies the RACS to recover to normal.

602. The RACS sends a resource query request to the BRAS.

603. The BRAS resolves the resource query request, obtains the information such as user ID in the resource query request, and sends the resolved information to the AN through an extended resource query request.

604. After receiving the extended resource query request, the AN queries the user's resource configuration information according to the obtained information such as user ID, and configures multicast resources for the user; if the configuration fails, the AN sends an extended configuration failure message to the BRAS.

605. The AN sends a resource configuration result to the BRAS through an extended resource query response.

606. The BRAS sends the resource configuration result to the RACS through a resource query response.

607. The RACS configures unicast resources according to the response.

After the user logs out abnormally and then logs in again, the processing is the same as the resource configuration and allocation described in the second embodiment and the third embodiment, and is not further described.

Such embodiments are exemplary only. Through the foregoing embodiments, the user's multicast admission control is exercised over the AN, and the user's unicast admission control is exercised over the RACS. Therefore, when unicast or multicast resources are not enough, the resources can be exchanged between the AN and the RACS, and the resources are allocated dynamically and saved.

In the embodiments of the present invention, after the corresponding resources are configured for multicast or unicast, when a new user accesses the service, the AN does not need to keep exchanging information with the RM like the processing in the second technical solution in the prior art. Therefore, the method under the present invention ensures accurate access of the user, reduces time of interactions between devices, shortens the delay, and ensures a good user experience.

In the foregoing embodiments, the communications between the AN and the BRAS are based on the extended Access Node Control Protocol (ANCP), and the communications between the RACS and the BRAS are based on the Common Open Policy Service (COPS) protocol, or the Diameter protocol, or the H.248 protocol. The following outlines the composition of the communication message between the AN and the BRAS, and between the BRAS and the RACS in an embodiment of the present invention.

To ensure normal communications between the devices, this embodiment extends the ANCP message on the basis of the prior art.

I. Extended ANCP message between the BRAS and the AN

The extended ANCP message includes these fields: circuit ID, program bandwidth, and response result. Generally, the extended ANCP message may be in one of the following encapsulation formats:

(1) TCP/IP-based encapsulation format

| Eth Header | IP header | TCP | ANCP message |
|---|---|---|---|

(2) ATM-based encapsulation format

| LLC | SNAP | ANCP message |
|---|---|---|

(3) Ethernet-based encapsulation format

| DMAC | SMAC | Ox880C | ANCP message |
|---|---|---|---|

In the foregoing embodiment, the extended resource allocation message and response between the BRAS and the AN, and the extended resource query request may be an extended ANCP message, and the information may be exchanged between the BRAS and the AN by extending a gray list. Supposing an ANCP message is extended, the following describes the format of a line configuration message such as the extended resource query request, extended releasing/requesting bandwidth resources request, extended resource configuration request, and line topology resource discovery message such as an extended resource configuration failure message. FIG. 7 shows a format of a line configuration message.

(1) Extended resource request message, which includes three fields: circuit ID, requested or released bandwidth, and request or release result.

The Access-Loop-Circuit-ID type value of the circuit ID field is set in a Type Length Value (TLV) column, and is expressed by 0x01. The value field may be expressed by an ASCII string of up to 63 bytes. The default format of the string is:

Access-Node-Identifier eth slot/port[:vlan-id] (port type is VDSL PTM)

Access-Node-Identifier atm slot/port:vpi.vci (port type is ATM)

The format of the string is configurable.

It should be noted that the format of CID field of the foregoing string needs to be configured as:

Access-Node-Identifier eth slot/port[:vlan-id][:user802.1p] (port type is VDSL PTM)

Access-Node-Identifier atm slot/port[:vlan-id][:user802.1p] (port type is ATM)

The type value of the “requested or released bandwidth” field is set in the TLV column, and is expressed by 0x06. The value field may be an ASCII string indicating the bandwidth of requested program (Kbps). The format is as follows:

PolicyType: operation type, “1” indicating bandwidth requesting, and “2” indicating resource release;

Bandwidth-Minimum (Kbps): minimum bandwidth requested;

Bandwidth-Maximum (Kbps): maximum bandwidth requested; and

Program Name or Program ID.

The request or release response result field (the result field of the line configuration message is set to success or failure, and the code field is set to 0) and the type value are set in the TLV column, and are expressed by 0x07. The value field may be an ASCII string indicating the bandwidth request result. The detailed format is as follows:

PolicyType: operation type, “1” indicating bandwidth requesting, and “2” indicating resource release;

ErrCode: error code, “0” indicating success of requesting or releasing the bandwidth, and other values indicating failure;

Bandwidth (Kbps): requested bandwidth value.

(2) Extended resource query message, which includes three fields: circuit ID, bandwidth information requested to be queried, and response result of querying bandwidth information.

The Access-Loop-Circuit-ID type value of the circuit ID is set in the TLV column, and is expressed by 0x01. The value field may be expressed by an ASCII string of up to 63 bytes. The default format of the string is:

Access-Node-Identifier eth slot/port[:vlan-id] (port type is VDSL PTM);

Access-Node-Identifier atm slot/port: vpi.vci (port type is ATM).

It should be noted that the Format of CID field of the foregoing string needs to be configured as:

Access-Node-Identifier eth slot/port[:vlan-id][:user802.1p] (port type is VDSL PTM);

Access-Node-Identifier atm slot/port[:vlan-id][:user802.1p] (port type is ATM).

The type value of the field of bandwidth information requested to be queried (both the AN and the RACS can initiate query of the user’s video bandwidth information) is set in the TLV column, and is expressed by 0x08. The value field may be an ASCII string indicating the bandwidth request result, and may be “Null” in practical applications.

The type value of the field of the response result of querying bandwidth information is set in the TLV column, and is expressed by 0x09. The value field may be an ASCII string indicating the bandwidth query result. The ASCII string is included in a bandwidth query response and carries information such as video bandwidth and video bandwidth threshold.

(3) Extended resource configuration message which includes three fields: circuit ID, bandwidth information requested to be configured, and response result of configuring bandwidth information.

The Access-Loop-Circuit-ID type value of the circuit ID is set in the TLV column, and is expressed by 0x01. The value field may be expressed by an ASCII string of up to 63 bytes. The default format of the string is:

Access-Node-Identifier eth slot/port[:vlan-id] (port type is VDSL PTM);

Access-Node-Identifier atm slot/port:vpi.vci (port type is ATM).

It should be noted that the Format of CID field of the foregoing string needs to be configured as:

Access-Node-Identifier eth slot/port[:vlan-id][:user802.1p] (port type is VDSL PTM);

Access-Node-Identifier atm slot/port[:vlan-id][:user802.1p] (port type is ATM).

The type value of the field of bandwidth information requested to be configured (the RACS initiates configuration of the user's video bandwidth information actively when the user logs in) is set in the TLV column, and is expressed by 0x0A. The value field is an ASCII string indicating the bandwidth requested. The format is as follows:

PolicyType: operation type, "1" indicating query of video bandwidth information, and "2" indicating configuration of user's video bandwidth information;

Video-Bandwidth (Kbps): total video bandwidth of the user (valid only if PolicyType=2);

Video-multicast-Bandwidth (Kbps): user's multicast bandwidth (valid only if PolicyType=2).

The type value of the field of the response result of configuring bandwidth information is set in the TLV column, and is expressed by 0x0B. The value field is an ASCII string indicating the result of configuring the bandwidth requested. The format is as follows:

PolicyType: operation type, "1" indicating a response of querying video bandwidth information, and "2" indicating a response of configuring user's video bandwidth;

ErrCode: error code, "0" indicating success, and other values indicating failure;

Video-Bandwidth (Kbps): total video bandwidth of the user (valid only if PolicyType=1);

Video-Bandwidth-Threshold (Kbps): threshold of user's video bandwidth (valid only if PolicyType=1).

II. Messages between the RACS and the BRAS, taking the COPS protocol as an example:

(1) Decision message (DEC) from the RACS to the BRAS, primarily designed to request or release program bandwidth and query the AN bandwidth information; state report message (RPT) from the BRAS to the RACS, primarily designed to indicate success or failure of requesting or releasing the program bandwidth and return a result of querying the AN bandwidth information.

(2) Request (REQ) message from the RACS to the BRAS, designed to request or release program bandwidth and query the RACS bandwidth information; decision (DEC) message from the RACS to the BRAS, designed to indicate success or failure of requesting or releasing the program bandwidth and return a result of querying the AN bandwidth information. The formats of the messages are described below.

(i) DEC message format—requesting or releasing program bandwidth:

```
<Decision Message> ::= <Common Header>
                       <Client Handle>
                       *(<Decision>) | <Error>
                       [<Integrity>]
 <De cision> ::= <Context>
                 <Decision: Flags>
                 [<Named Decision Data: Provisioning >]
<Named Decision Data> ::= <<Install Decision> |
                          <Remove Decision>>
<Install Decision>    ::= *(<PRID> <EPD>)
<Remove Decision>     ::= *(<PRID>|<PPRID>)
EPD : ssgANCtrlTable
```

-continued

```
ssgANCtrlTable contains one entry: ssgANCtrlEntry.
ssgANCtrlEntry ::= SEQUENCE {
        ssgANCtrlType              INTEGER
        ssgANCtrlMinBandwidth       Unsigned32
          ssgANCtrlMaxBandwidth     Unsigned32
          ssgANCtrlResult          INTEGER
     }
```

The meaning of user ID is: The user ID is not a true parameter in the DEC message. The BRAS uses Client-Handle as a keyword to find the user information such as circuit ID, and transmits the circuit ID to the AN.

The meaning of the operation type is: The ssgANCtrlType in the DEC message indicates the operation type. "1" indicates requesting bandwidth from the AN; "2" indicates releasing bandwidth to the AN; "3" indicates responding to the AN bandwidth request; and "4" indicates responding to the AN bandwidth release. The meaning of program bandwidth is: The program bandwidth is expressed by ssgANCtrlUpBandwidth (uplink bandwidth) and ssgANCtrlDownBandwidth (downlink bandwidth). The meaning of the AN bandwidth operation result is: The AN bandwidth operation result is a result of the AN requesting bandwidth from the RACS or releasing bandwidth to the RACS. "1" indicates success of the AN requesting bandwidth from the RACS or releasing bandwidth to the RACS. "2" indicates failure of the AN requesting bandwidth from the RACS or releasing bandwidth to the RACS.

(ii) RPT message format—requesting or releasing program bandwidth:

```
<Report State> ::= <Common Header>
                   <Client Handle>
                   <Report Type>
                   *(<Named ClientSI>)
                   [<Integrity>]
```

For Success and Failure Report-Type Data Format:

```
<Named ClientSI: Success and Failure Report> ::= <[<GPERR>]
*(<report>)>
<report > ::= <ErrorPRID> <CPERR> *(<PRID><EPD>)
```

The value of "Result" is 1 or 2. "1" indicates success of the BRAS executing the decision; and "2" indicates failure of the BRAS executing the decision. Error Code: If the result is failure, the detailed error code is expressed by a CPERR object.

(iii) DEC message format—querying user's video bandwidth information:

```
<Decision Message> ::= <Common Header>
                       <Client Handle>
                       *(<Decision>) | <Error>
                       [<Integrity>]
<De cision> ::= <Context>
                <Decision: Flags>
                [<Named Decision Data: Provisioning >]
<Named Decision Data> ::= <<Install Decision>|
                          <Remove Decision>>
<Install Decision>    ::= *(<PRID> <EPD>)
<Remove Decision>     ::= *(<PRID>|<PPRID>)
```

EPD: ssgANCtrlTable1—querying user's video bandwidth information:

```
ssgANCtrlTable 1contains one entry: ssgANCtrlEntry1.
ssgANCtrlEntry1 ::= SEQUENCE {
        ssgANCtrlType1                     INTEGER
        ssgANCtrlVideoBandwidth   Unsigned32
         ssgANCtrlVideoBandwidthThreshold      U nsigned32
    }
```

The meaning of user ID is: The user ID is not a true parameter in the DEC message. The BRAS uses Client-Handle as a keyword to find the user information such as circuit ID, and transmits the circuit ID to the AN. Operation type: The ssgANCtrlTypel in the DEC message represents the operation type. "1" indicates requesting to query the user's video bandwidth information, and "2" indicates a response of querying the user's video bandwidth information. The user's video bandwidth information in the response includes: total video bandwidth: ssgANCtrlVideoBandwidth(bps); and video bandwidth threshold: ssgANCtrlVideoBandwidth-Threshold (bps).

(iv) RPT message format—querying user's video bandwidth information:

```
<Report State> ::= <Common Header>
                        <Client Handle>
                        <Report Type>
                        *(<Named ClientSI>)
                        [<Integrity>]
```

For Success and Failure Report-Type Data Format:

```
<Named ClientSI: Success and Failure Report> ::= <[<GPERR>]
*(<report>)>
<report> ::= <ErrorPRID> <CPERR> *(<PRID><EPD>)
```

The value of "Result" is 1 or 2. "1" indicates success of the BRAS executing the decision; and "2" indicates failure of the BRAS executing the decision. Error Code: If the result is failure, the detailed error code is expressed by a CPERR object.

(v) REQ message format:

```
<Request> ::= <Common Header>
                                <Client Handle>
                                <Context = config request>
                                *(<Named ClientSI>)
                                [<Integrity>]
<Nam ed ClientSI: Request> ::= <*(<PRID> <EPD>)>
EPD : ssgCtrlTable
ssgCtrlTable contains one entry: ssgCtrlEntry.
ssgCtrlEntry ::= SEQUENCE {
        ssgCtrlType                          INTEGER
        ssgCtrlUpBandwidth                  Unsigned32
        ssgCtrlDownBandwidth               Unsigned32
}
```

Operation type: The ssgCtrlType in the DEC message represents the operation type. "1" indicates requesting bandwidth from the RACS; and "2" indicates releasing bandwidth to the RACS. Program bandwidth: The program bandwidth is expressed by ssgCtrlUpBandwidth (uplink bandwidth) and ssgCtrlDownBandwidth (downlink bandwidth).

(III) Messages between the IPTV server and the RACS, taking the Simple Object Access Protocol (SOAP) as an example:

The messages between the IPTV server and the RACS include: QoS request message sent from the IPTV server to the RACS and designed to request program bandwidth; QoS response message sent from the RACS to the IPTV server and designed to respond to an AAR message; QoS release message sent from the IPTV server to the RACS and designed to release program bandwidth; and QoS release response message sent from the RACS to the IPTV server and designed to respond to the QoS release message.

(1) Format of QoS request message:

```
<SvcX: AARMessage >
< MsgType >
< SessionId>
< ApplicationId>
< MaxBandwidthUL>
< MaxBandwidthDL>
< FlowCount>
< MediaInfos>
<MediaType>
<FlowDirection>
<MaxBandwidth>
<SrcIp>
<DestIp>
<SrcBeginPort>
<SrcEndPort>
<DestBeginPort>
<DestEndPort>
<ProtocolType>
</MediaInfos>
...
<UsrLocation>
</SvcX: AARMessage >
```

In a QoS request message, the "SessionId" identifies a VOD session. MediaInfos: The RACS supports 8 MediaInfos at most. The RACS needs to provide at least one MediaInfos program bandwidth: For each direction, the program bandwidth is a sum of MaxBandwidth of all MediaInfos. User ID: The SrcIp in the upstream MediaInfos and the DstIp in the downstream MediaInfo are designed to identify a user.

(2) Format of QoS response message:

```
<SvcX: AAAMessage >
< MsgType >
< SessionId>
< ResultCode>
</SvcX: AAAMessage >
```

(3) Format of QoS release message:

```
<SvcX:STRMessage >
  < MsgType >
< SessionId>
</SvcX:STRMessage >
```

(4) Format of QoS release response message:

```
<SvcX: STAMessage >
  < MsgType >
< SessionId>
```

-continued

< ResultCode>
</SvcX: STAMessage >

The messages described above and the parameters in the messages are exemplary only. The practical application of the present invention is not limited to the messages and the message formats described above.

A resource allocation apparatus is provided in the seventh embodiment of the present invention.

Figure 8:
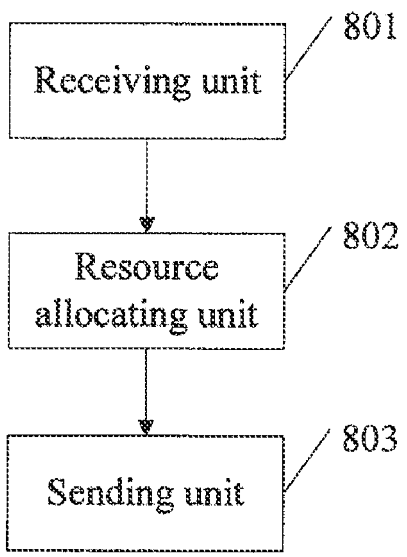
FIG. 8 shows a structure of a resource allocation apparatus in an embodiment of the present invention.

As shown in FIG. 8, the resource allocation apparatus includes: a receiving unit 801, configured to receive a resource allocation message sent by a unicast/multicast access control entity and forwarded by an intermediate network entity; a resource allocating unit 802, configured to allocate resources to the unicast/multicast access control entity through the intermediate network entity when unicast/multicast resources are not enough; a sending unit 803, configured to send a resource allocation response to the unicast/multicast access control entity through the intermediate network entity.

Figure 9:
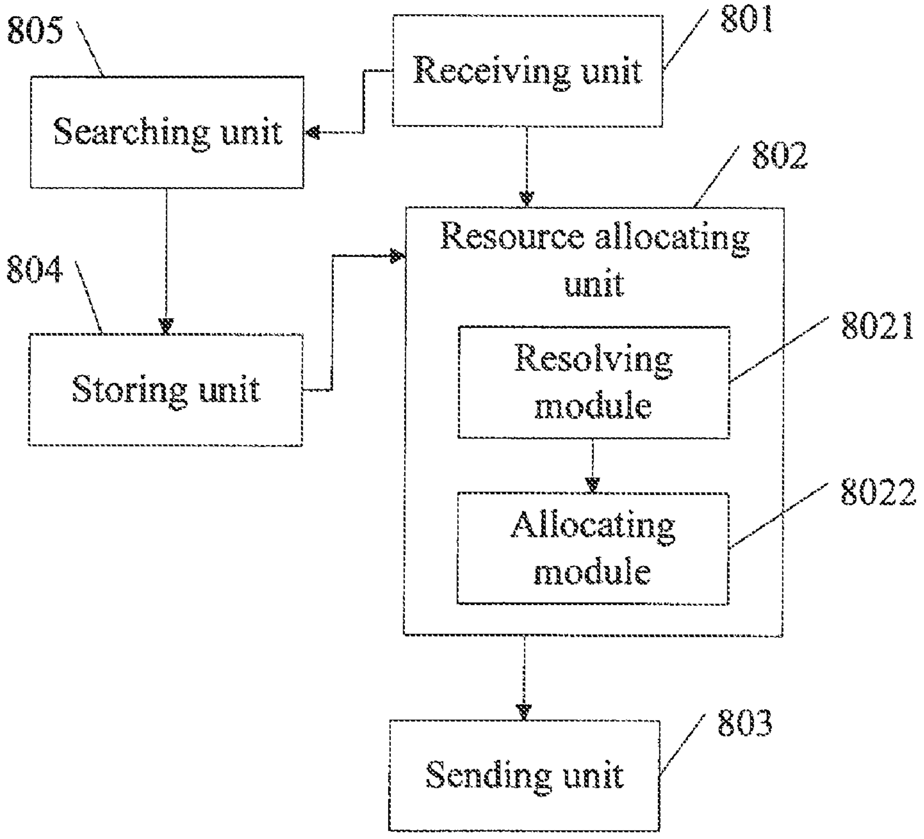
FIG. 9 shows a resource allocation apparatus in an embodiment of the present invention.

As shown in FIG. 9, the resource allocating unit 802 includes: a resolving module 8021, configured to resolve the resource allocation message; and an allocating module 8022, configured to allocate resources to the unicast/multicast access control entity according to the result of resolving the resource allocation message.

As shown in FIG. 9, to improve efficiency of allocating resources, the resource allocation apparatus further includes:

a storing unit 804, configured to store resource configuration information of a user; and a searching unit 805, configured to search for the user's resource configuration information corresponding to the resource allocation message according to the resource allocation message.

In this case, the receiving unit 801 is further configured to receive a resource query message from the unicast access control entity; and the sending unit 803 is further configured to send a resource release message to the unicast access control entity.

The resource allocation apparatus shown in FIG. 8 or 9 may be located in a unicast access control entity or a multicast access control entity.

Figure 10:
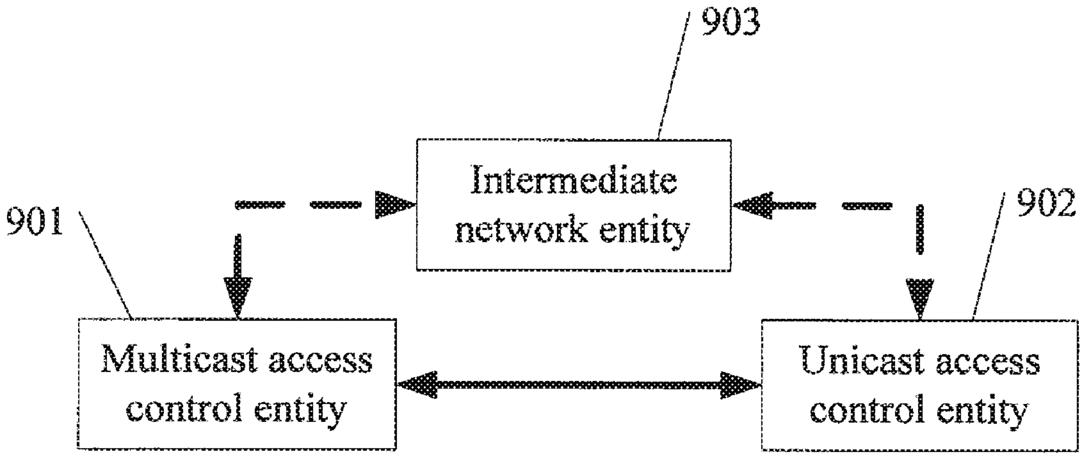
FIG. 10 shows a structure of a resource allocation system in an embodiment of the present invention.

As shown in FIG. 10, a resource allocation system provided in an embodiment of the present invention includes: a multicast access control entity 901, configured to allocate resources to a unicast access control entity when unicast resources are not enough; a unicast access control entity 902, configured to allocate resources to the multicast access control entity when multicast resources are not enough; and an intermediate network entity 903, configured to transfer information for the multicast access control entity or unicast access control entity as an intermediary between the multicast access control entity and the unicast access control entity.

The communications between the multicast access control entity and the intermediate network entity are based on the extended ANCP protocol, and the communications between the unicast access control entity and the intermediate network entity are based on the COPS protocol, or the Diameter protocol, or the H.248 protocol. Besides, in this embodiment, the multicast access control entity and the unicast access control entity may include the resource allocation apparatus illustrated in FIG. 8 or FIG. 9. The working principles of the apparatus are the same as the description in the embodiment of the resource allocation method, and are not further described.

In the embodiments of the present invention, when a user accesses the service, if the unicast/multicast resources are not enough, the multicast access control entity or unicast access control entity can allocate resources to the party which lacks resources through the intermediate network entity. Therefore, the method provided in the embodiments allocates resources to the user dynamically, saves bandwidth resources of the IPTV service, and ensures the user experience.

Moreover, when the user switches channels, the multicast access control entity is responsible for multicast access control of the user and the unicast access control entity is responsible for unicast access control of the user. Therefore, in the process of switching channels, it is not necessary to keep interacting between multiple devices to decide whether to allow the user's access. In this way, the delay of the IPTV service is shortened and the user experience is improved.

Persons of ordinary skill in the art should understand that all or part of the steps of the method under the present invention may be implemented by a program instructing relevant hardware. The program may be stored in a computer readable storage medium. When the program runs, the steps of the method specified in the above embodiments are performed. The storage medium may be a magnetic disk, a Compact Disk-Read Only Memory (CD-ROM), a Read Only Memory (ROM), or a Random Access Memory (RAM).

The above descriptions are merely some exemplary embodiments of the present invention, but not intended to limit the scope of the present invention. Any modifications or variations that can be easily derived by those skilled in the art should fall within the scope of the present invention. Therefore, the protection scope of the present invention is subject to the appended claims.

What is claimed is:

1. A method for allocating Internet Protocol Television (IPTV) resources, comprising:

allocating, by an access node, resources to a unicast access control entity through a broadband remote access server when unicast resources are not enough; and allocating, by the unicast access control entity, resources to the access node through the broadband remote access server when multicast resources are not enough;

wherein communications between the access node and the broadband remote access server are based on the extended Access Node Control Protocol (ANCP).

2. The method for allocating IPTV resources according to claim 1, wherein the step of the access node or the unicast access control entity allocating the resources to the unicast access control entity or the access node through the broadband remote access server comprises:

sending, by the unicast access control entity or the access node, a resource request or an extended resource request to the broadband remote access server;

sending, by the broadband remote access server, the extended resource request or the resource request to the access node or the unicast access control entity according to the resource request or the extended resource request;

sending, by the access node or the unicast access control entity, an extended resource allocation response or the resource allocation response to the broadband remote access server after allocating the resources to the unicast access control entity or the access node according to the extended resource request or the resource request; and sending, by the broadband remote access server, a resource allocation response or the extended resource allocation response to the unicast access control entity or the access node according to the extended resource allocation response or the resource allocation response.

3. The method for allocating IPTV resources according to claim 1, further comprising:

storing resource configuration information of a user on the access node or the unicast access control entity;

sending, by the unicast access control entity or the access node, a resource query message or the extended resource query message to the access node or the unicast access control entity through the broadband remote access server when the user accesses a service;

querying, by the access node or the unicast access control entity, the resource configuration information of the user; and configuring, by the access node or the unicast access control entity, the multicast resources or the unicast resources for the user.

4. The method for allocating IPTV resources according to claim 3, wherein the step of the unicast access control entity or the access node sending the resource query message or the extended resource query message to the access node or the unicast access control entity through the broadband remote access server comprises:

sending, by the unicast access control entity or the access node, a resource query request or an extended resource query request to the broadband remote access server; and sending, by the broadband remote access server, an extended resource query request or a resource query request to the access node or the unicast access control entity according to the resource query request or the extended resource query request;

after the access node or the unicast access control entity configures the multicast resources or the unicast resources for the user, the method further comprises:

sending, by the access node or the unicast access control entity, an extended resource query response or a resource query response to the broadband remote access server; and sending, by the broadband remote access server, a resource query response or an extended resource query response to the unicast access control entity or the access node according to the extended resource query response or the resource query response.

5. The method for allocating IPTV resources according to claim 1, further comprising:

sending, by the access node or the unicast access control entity, an extended resource release request or a resource release request to the broadband remote access server when a user leaves a multicast group or stops Video On Demand (VOD) of a unicast program;

sending, by the broadband remote access server, a resource release request or an extended resource release request to the unicast access control entity or the access node according to the extended resource release request or the resource release request;

sending, by the unicast access control entity or the access node, a resource release response or an extended resource release response to the broadband remote access server after the resources are released; and sending, by the broadband remote access server, an extended resource release response or the resource release response to the access node or the unicast access control entity according to the resource release response or the extended resource release response.

6. The method for allocating IPTV resources according to claim 1, wherein:

communications between the unicast access control entity and the broadband remote access server are based on one of the group consisting of a Common Open Policy Service (COPS) protocol, a Diameter protocol, and an H.248 protocol.

7. The method for allocating IPTV resources according to claim 6, wherein:

when the extended ANCP protocol is applied between the access node and the a broadband remote access server, the extended resource request comprises three fields: a circuit ID field, a requested or released bandwidth field, and a request or release result field; and the requested or released bandwidth field comprises: operation type, minimum bandwidth requested, maximum bandwidth requested, and a program name or a program ID.

8. The method for allocating IPTV resources according to claim 6, wherein:

when the extended ANCP protocol is applied between the access node and the broadband remote access server, the extended resource query message comprises three fields: a circuit ID field, a field of bandwidth information requested to be queried, and a field of a response result of querying the bandwidth information.

9. The method for allocating IPTV resources according to claim 6, wherein:

when the extended ANCP protocol is applied between the access node and the broadband remote access server, an extended resource configuration message comprises three fields: a circuit ID field, a field of bandwidth information requested to be configured, and a field of a response result of configuring the bandwidth information; and the bandwidth information requested to be configured field comprises: total video bandwidth of the user, and multicast bandwidth of the user; and the response result of configuring bandwidth information field comprises: an operation type, an error code, total video bandwidth of the user, and a video bandwidth threshold of the user.

10. A resource allocation apparatus, comprising:

a receiving unit, configured to receive a resource allocation message sent by a unicast access control entity or an access node and forwarded by a broadband remote access server;

a resource allocating unit, configured to allocate resources to the unicast access control entity or the access node through the broadband remote access server when unicast or multicast resources are not enough; and a sending unit, configured to send a resource allocation response to the unicast access control entity or the access node through the broadband remote access server wherein communications between the access node and the broadband remote access server are based on the extended Access Node Control Protocol (ANCP).

11. The resource allocation apparatus according to claim 10, wherein the resource allocating unit comprises:

a resolving module, configured to resolve the resource allocation message; and an allocating module, configured to allocate the resources to the unicast access control entity or the access node according to a result of resolving the resource allocation message.

12. The resource allocation apparatus according to claim 10, further comprising:

a storing unit, configured to store resource configuration information of a user; and a searching unit, configured to search for the user's resource configuration information corresponding to the resource allocation message according to the resource allocation message.

13. The resource allocation apparatus according to claim 10, wherein:

the receiving unit is further configured to receive a resource query message from the unicast access control entity; and the sending unit is further configured to send a resource release message to the unicast access control entity.

14. A resource allocation system, comprising:

an access node, configured to allocate resources to a unicast access control entity through an broadband remote access server when unicast resources are not enough;

a unicast access control entity, configured to allocate resources to the access node through the broadband remote access server when multicast resources are not enough; and an broadband remote access server, configured to transfer information for the access node or the unicast access control entity as an intermediary between the access node and the unicast access control entity;

wherein communications between the access node and the broadband remote access server are based on the extended Access Node Control Protocol (ANCP).

15. The resource allocation system according to claim 14, wherein:

communications between the unicast access control entity and the broadband remote access server are based on one of the group consisting of a Common Open Policy Service (COPS) protocol, a Diameter protocol, and an H.248 protocol.

* * * * *

UNITED STATES PATENT AND TRADEMARK OFFICE

CERTIFICATE OF CORRECTION

PATENT NO. : 8,340,127 B2
APPLICATION NO. : 12/915946
DATED : December 25, 2012
INVENTOR(S) : Gu et al.

It is certified that error appears in the above-identified patent and that said Letters Patent is hereby corrected as shown below:

In the Claims:

Column 16, line 11, “the a broadband” should read -- the broadband --.

Signed and Sealed this
Twenty-first Day of May, 2013

Teresa Stanek Rea
*Acting Director of the United States Patent and Trademark Office*